(12) United States Patent
Dalsgaard et al.

(10) Patent No.: US 9,736,713 B2
(45) Date of Patent: Aug. 15, 2017

(54) REDUCED USER EQUIPMENT IMPACT FROM PERFORMING WIDER BANDWIDTH MEASUREMENTS

(71) Applicant: Nokia Corporation, Espoo (FI)

(72) Inventors: Lars Dalsgaard, Oulu (FI); Jorma Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 515 days.

(21) Appl. No.: 13/782,970

(22) Filed: Mar. 1, 2013

(65) Prior Publication Data
US 2014/0043989 A1 Feb. 13, 2014

Related U.S. Application Data

(60) Provisional application No. 61/682,073, filed on Aug. 10, 2012.

(51) Int. Cl.
*H04L 12/26* (2006.01)
*H04W 24/10* (2009.01)
*H04W 24/00* (2009.01)
*H04W 36/00* (2009.01)

(52) U.S. Cl.
CPC ........... *H04W 24/10* (2013.01); *H04W 24/00* (2013.01); *H04W 36/0094* (2013.01)

(58) Field of Classification Search
CPC ............................... H04W 24/00; H04L 43/50
See application file for complete search history.

(56) References Cited

U.S. PATENT DOCUMENTS

2011/0110251 A1 5/2011 Krishnamurthy et al.
2013/0094381 A1* 4/2013 Han et al. .................... 370/252

FOREIGN PATENT DOCUMENTS

WO WO-2007124696 A1 11/2007
WO WO-2011029473 A1 3/2011
WO WO-2011098049 A1 8/2011

OTHER PUBLICATIONS

"Aspects related to RSRQ Measurement over Wide Measurement Bandwidth," 3GPP TSG RAN WG4 Meeting #64, R-124276, Agenda item: 4.2.3, Ericsson and ST-Ericsson, Aug. 13-17, 2012.

(Continued)

*Primary Examiner* — Afshawn Towfighi
(74) *Attorney, Agent, or Firm* — Mintz Levin Cohn Ferris Glovsky and Popeo, P.C.

(57) ABSTRACT

Methods and apparatus, including computer program products, are provided for wide bandwidth measurements. In some example embodiments, there is provided a method. The method may include receiving, at a user equipment, an indicator and a measurement bandwidth, wherein the indicator represents whether the user equipment is enabled to perform a wide bandwidth measurement, and wherein the received measurement bandwidth represents a maximum allowed measurement bandwidth; and performing, by the user equipment, the wide bandwidth measurement, when the received measurement bandwidth equals or exceeds a threshold and the indicator represents a request to the user equipment to perform the wide bandwidth measurement. Related apparatus, systems, methods, and articles are also described.

17 Claims, 5 Drawing Sheets

(56) References Cited

OTHER PUBLICATIONS

"Comprehensive solution for the issue of RSRQ measurement BW," 3GPP TSG RAN WG4 Meeting #63, R4-122524, Agenda item: 6.1.3, NTT Docomo, May 21-25, 2012.
Consideration on RSRQ measurement bandwidth, 3GPP TSG RAN WG4 (Radio) Meeting #64, R4-124335, Agenda item: 6.1.3, Research in Motion UK Limited, Aug. 13-17, 2012.
"Consideration on RSRQ measurement bandwidth," 3GPP TSG RAN WG4 Meeting #62Bis, R4-121461, Agenda item: 6.1.3, Samsung, Mar. 26-30, 2012.
"Consideration on RSRQ measurement bandwidth," 3GPP TSG RAN WG4 Meeting #63, R4-63AH-0152, Agenda item: 9, Samsung, Jun. 26-28, 2012.
"Consideration on RSRQ measurement BW," 3GPP TSG RAN WG4 Meeting #62Bis, R4-121794, Agenda item: 6.1.3, Nokia Corporation, Mar. 26-30, 2012.
"Considerations on RSRQ measurement bandwidth," 3GPP TSG Ran 4 #63 UE performance AH, R4-63AH-0183, Agenda item: 9, Nokia Corporation, Jun. 26-28, 2012.
"Discussion on wider bandwidth RSRQ measurement," 3GPP TSG RAN WG2 Meeting #80, R2-125784, Agenda item: 5.3.1, Huawei and HiSilicon, Nov. 12-16, 2012.
"Draft LS to RAN2 on wideband RSRQ measurement," 3GPP TSG RAN WG4 Meeting #64bis, R4-126013, RAN WG4, Oct. 8-12, 2012.
"Further considerations on RSRQ measurement bandwidth," 3GPP TSG RAN WG4 Meeting #64, R4-124515, Agenda item: 4.2.3, Renesas Mobile Europe Ltd., Aug. 13-17, 2012.
"Further considerations on RSRQ measurement bandwidth," 3GPP TSG Ran4 #64, R4-124623, Agenda item: 6.1.3, Nokia Corporation, Aug. 13-17, 2012.
"Introduction of wideband RSRQ measurements," 3GPP TSG RAN WG2 #80, Agenda item: 5.3.1, NTT Docomo, Inc., Nov. 12-16, 2012.
"Introduction of Wideband RSRQ measurements," 3GPP TSG RAN WG2 Meeting #80, R2-125664, NTT Docomo and Ericsson, Nov. 12-16, 2012.
"Introduction of wideband RSRQ measurements," 3GPP TSG RAN WG2 Meeting #80, R2-125862. NTT Docomo, Inc., Ericsson, ST-Ericsson, ZTE Corporation, an CATT. Nov. 12-16, 2012.
"Introduction of wideband RSRQ measurements," 3GPP TSG RAN WG2 Meeting #80, RS-125863. NTT Docomo, Inc., Ericsson, ST-Ericsson, ZTE Corporation, and CATT. Nov. 12-16, 2012.
"Issues on narrow measurement bandwidth," 3GPP TSG-RAN Working Group 4 Meeting #60, R4-114243, Agenda item: 6.1.3, Ntt Docomo, Aug. 22-26, 2011.
"RSRQ Measurement over Wide Measurement Bandwidth," 3GPP TSG RAN WG4 Meeting #63, R4-122639, Agenda item: 4.2.3, Ericsson and ST-Ericsson, May 21-25, 2012.
"Simulation Results and Some Consideration on RSRQ Measurement Bandwidth," 3GPP TSG RAN WG4 Meeting #62bis, R4-122542, Agenda item: 6.1.3, ZTE, May 21-25, 2012.
"Way Forward on RSRQ measurement bandwidth," 3GPP TSG RAN WG4 Meeting #62Bis, R-122205, Agenda item: 4.2.3, Renesas Mobile Europe, Mar. 26-30, 2012.
"Wideband RRM Measurements," 3GPP TSG RAN WG4 #63, R4-122811, Agenda item: 6.1.3, Qualcomm Incorporated, 2012.
3GPP, "Technical Specification Group Radio Access Network; Evolved Universal Terrestrial Radio Access (E-UTRA); LTE physical layer; General description (Release 10)," 3rd Generation Partnership Project, 3GPP TS 36.201 V10.0.0, Dec. 2010.
3GPP, "Technical Specification Group Radio Access Network; Evolved Universal Terrestrial Radio Access (E-UTRA); LTE physical layer; General description (Release 11)," 3rd Generation Partnership Project, 3GPP TS 36.201 V11.1.0, Dec. 2012.
3GPP, "Technical Specification Group Radio Access Network; Evolved Universal Terrestrial Radio Access (E-UTRA); Multiplexing and channel coding (Release 10)," 3rd Generation Partnership Project, 3GPP TS 36.212 V10.6.0, Jun. 2012.
3GPP, "Technical Specification Group Radio Access Network; Evolved Universal Terrestrial Radio Access (E-UTRA); Multiplexing and channel coding (Release 11)," 3rd Generation Partnership Project, 3GPP TS 36.212 V11.1.0, Dec. 2012.
3GPP, "Technical Specification Group Radio Access Network; Evolved Universal Terrestrial Radio Access (E-UTRA); Physical Channels and Modulation (Release 10)," 3rd Generation Partnership Project, 3GPP TS 36.211 V10.5.0, Jun. 2012.
3GPP, "Technical Specification Group Radio Access Network; Evolved Universal Terrestrial Radio Access (E-UTRA); Physical Channels and Modulation (Release 11)," 3rd Generation Partnership Project, 3GPP TS 36.211 V11.1.0, Dec. 2012.
3GPP, "Technical Specification Group Radio Access Network; Evolved Universal Terrestrial Radio Access (E-UTRA); Physical layer procedures (Release 10)," 3rd Generation Partnership Project, 3GPP TS 36.213 V10.6.0, Jun. 2012.
3GPP, "Technical Specification Group Radio Access Network; Evolved Universal Terrestrial Radio Access (E-UTRA); Physical layer procedures (Release 11)," 3rd Generation Partnership Project, 3GPP TS 36.213 V11.1.0, Dec. 2012.
3GPP, "Technical Specification Group Radio Access Network; Evolved Universal Terrestrial Radio Access (E-UTRA); Physical layer; Measurements (Release 10)," 3rd Generation Partnership Project, 3GPP TS 36.214 V10.1.0, Mar. 2011.
3GPP, "Technical Specification Group Radio Access Network; Evolved Universal Terrestrial Radio Access (E-UTRA); Physical layer; Measurements (Release 11)," 3rd Generation Partnership Project, 3GPP TS 36.214 V11.1.0, Dec. 2012.
3GPP, "Technical Specification Group Radio Access Network; Evolved Universal Terrestrial Radio Access (E-UTRA); Radio Resource Control (RRC); Protocol specification (Release 11)," 3rd Generation Partnership Project, 3GPP TS 36.331 V11.0.0, Jun. 2012.
3GPP, "Technical Specification Group Radio Access Network; Evolved Universal Terrestrial Radio Access (E-UTRA); Requirements for support of radio resource management (Release 11)," 3rd Generation Partnership Project, 3GPP TS 36.133 V11.1.0, Jun. 2012.

\* cited by examiner

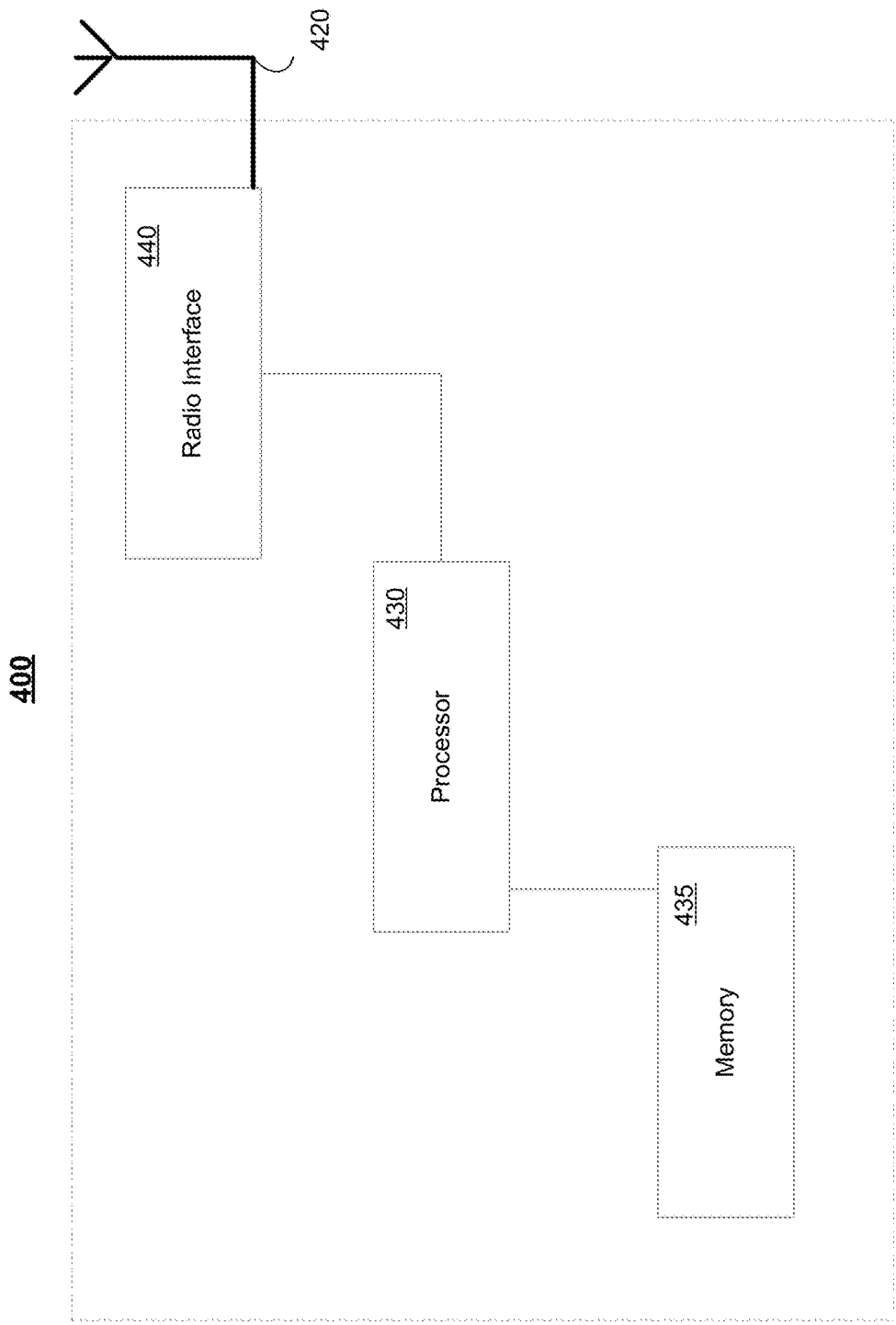

REDUCED USER EQUIPMENT IMPACT FROM PERFORMING WIDER BANDWIDTH MEASUREMENTS

CROSS-REFERENCE TO RELATED APPLICATION

This application claims the benefit under 35 U.S.C. §119(e) of the following provisional application, which is incorporated herein by reference in its entirety: U.S. Application No. 61/682,073, entitled "Reference Signal Received Quality Measurement Bandwidth Adaptation," filed Aug. 10, 2012.

FIELD

The subject matter disclosed herein relates to wireless communications, and, in particular, mobility related measurements.

BACKGROUND

When, for example, a 10 megahertz (MHz) long term evolution (LTE) cell is overlapping 5+5 MHz wideband code division multiple access (WCDMA) cells, such as two single carrier WCDMA cells, and reference signal, received quality (RSRQ) measurement is carried out over the central seventy-two subcarriers corresponding to six resource blocks (RBs), this particular RSRQ measurement would be carried out in a guard band between, for example, the two WCDMA cells. Consequently, the RSRQ may be overestimated, and as the RSRQ could be used for handover decisions, the mobility functionality of the system may also be affected.

Various approaches may be provided for addressing this situation. For example, complex approaches including new signaling elements may be used to try to require the user equipment, under certain conditions, to perform RSRQ measurements over a wider bandwidth as compared to a minimum requirement of, for example, six physical resource blocks (6PRBs). Some specifications may only require a user equipment to perform measurements over the six center PRBs (which corresponds to seventy-two subcarriers), in Evolved-Universal Terrestrial Radio Access Network (E-UTRAN) for both intra-frequency measurements and inter-frequency measurements.

The Third Generation Partnership Project (3GPP), Technical Specification (TS) 36.331 includes an option for the network to indicate the bandwidth of configured carriers using the "allowedMeasBandwidth" parameter. This "allowedMeasBandwidth" option is used to be able to restrict the maximum measurement bandwidth that may be used by the user equipment, when the user equipment chooses to perform measurements on a wider bandwidth than required as minimum. The "allowedMeasBandwidth" parameter represents a maximum bandwidth that can be used when the user equipment performs a wider bandwidth measurements. For example, the user equipment may choose to perform mobility measurements of detected cells using a bandwidth wider than a minimum requirement, such as six PRBs, but the measurement bandwidth may not be allowed to exceed the indicated "allowedMeasBandwidth."

SUMMARY

In some example embodiments, there is provided a method for wide bandwidth measurements. The method may include receiving, at a user equipment, an indicator and a measurement bandwidth, wherein the indicator represents whether the user equipment is enabled to perform a wide bandwidth measurement, and wherein the received measurement bandwidth represents a maximum allowed measurement bandwidth; and performing, by the user equipment, the wide bandwidth measurement, when the received measurement bandwidth equals or exceeds a threshold and the indicator represents a request to the user equipment to perform the wide bandwidth measurement.

In some variations, one or more of the featured disclosed herein including one or more of the following features can optionally be included in any feasible combination. The received measurement bandwidth may comprise an allowed measurement bandwidth in accordance with The Third Generation Partnership Project, Technical Specification (TS) 36.331. The threshold may comprise an allowedMeasBandwidth, wherein the allowedMeasBandwidth may comprise at least one of 50 resource blocks or 10 Megahertz. The indication and the measurement bandwidth may be received in a measurement configuration signaled by the network when in a connected mode, or received in at least one system information block broadcast by the network when in an idle mode. The performing may further include performing a minimum bandwidth measurement comprising six physical resource blocks, when at least one of the indicator represents that the user equipment is not enabled by the network to perform the wide bandwidth measurement or the received measurement bandwidth is less than the threshold. The wide bandwidth measurement may comprise at least one of a received signal, strength indicator measurement, a reference signal, received power measurement, a reference signal, received quality measurement, and wherein the wide bandwidth measurement exceeds six physical resource blocks but does not exceed the maximum allowed measurement bandwidth. The user equipment may send a measurement report including information representative of whether wide bandwidth measurement was performed by the user equipment.

Articles are also described that comprise a tangibly embodied computer-readable medium embodying instructions that, when performed, cause one or more machines (for example, computers, etc.) to result in operations described herein. Similarly, apparatus are also described that can include a processor and a memory coupled to the processor. The memory can include one or more programs that cause the processor to perform one or more of the operations described herein.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

FIG. 4 depicts an example of a base station, in accordance with some example embodiments.

Figure 1:
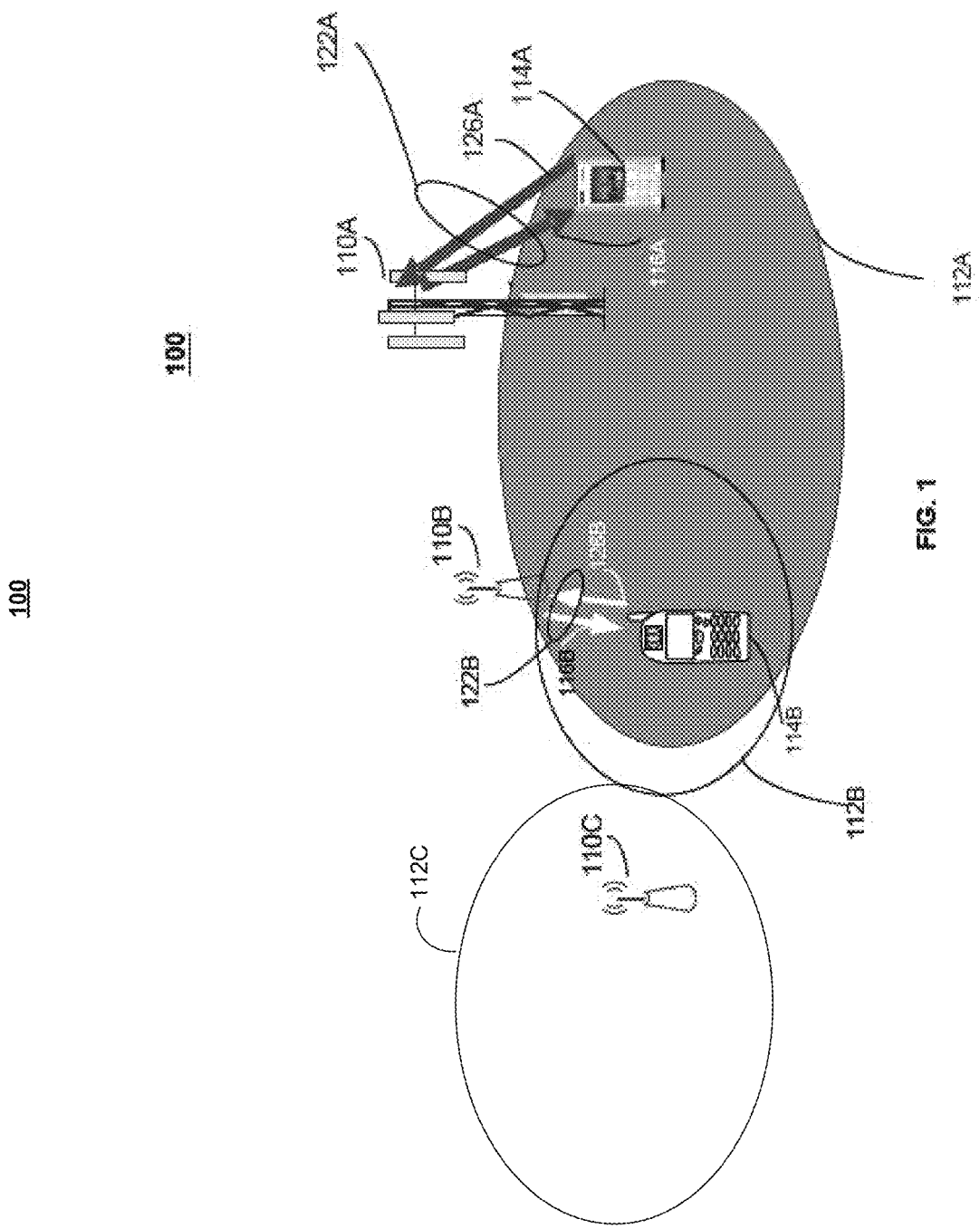
FIG. 1 depicts an example of a system, in accordance with some example embodiments.

Like labels are used to refer to same or similar items in the drawings.

DETAILED DESCRIPTION

In some example embodiments, a wideband measurement is only performed when at least two conditions are satisfied. First, the wideband measurement may be performed by the user equipment, when a bandwidth parameter, such as the "allowedMeasBandwidth" parameter, is greater than or equal to a certain threshold. Second, an indication bit or bits indicates whether the wideband measurement should be performed (for example, whether the user equipment is enabled to perform the wider bandwidth measurement). For example, the wideband measurement may be performed, when the "allowedMeasBandwidth" parameter is greater than or equal to a threshold (also referred to herein as a decision threshold) and an indication bit represents that the wideband measurement should be performed as well. However, the wideband measurement would not be performed (or needed at the user equipment), when the "allowedMeasBandwidth" parameter is greater than or equal to the threshold but the indication bit represents that the wideband measurement should not be performed. Nor would the wideband measurement be performed, when the "allowedMeasBandwidth" parameter is less than the threshold but the indication bit represents that the wideband measurement should be performed.

In some example embodiments, the network may send to the user equipment the "allowedMeasBandwidth" parameter and the indication bit representative of whether the wideband measurement should be performed. In some example embodiments, the indication bit may comprise one or more bits. For example, when the indication bit has a value of "1" (or True), the wideband measurement would be performed, when the "allowedMeasBandwidth" parameter is greater than or equal to the threshold. However, if the indication bit has a value "0" (or False), the wideband measurement would not need to be performed, regardless of the value of the "allowedMeasBandwidth" parameter. Nor would the wideband measurement need to be made, when the indication bit has a value of "1" (or True) but the "allowedMeasBandwidth" parameter is less than the threshold. The threshold used in connection with the "allowedMeasBandwidth" may be predefined or signaled by the network. For example, the threshold may be predefined as 10 MHz, although other thresholds may be used as well.

In some example embodiments, the network, including a base station and the like, may signal to the user equipment the "allowedMeasBandwidth" in accordance with 3GPP TS 36.331 and subsequent revisions thereto, although the allowed measurement bandwidth may be provided in other ways as well. Although some of the examples disclosed herein refer to the indication bit as a bit, it may take other forms as well.

In some example embodiments, the wideband measurement may be implemented at the user equipment based on the indication bit and the "allowedMeasBandwidth" parameter, as noted above. Moreover, the indication bit and the "allowedMeasBandwidth" parameter may be used to determine whether to make wide bandwidth measurement in intra-frequency, inter-frequency, and inter-radio access technology air interfaces. The user equipment may thus implement the wide bandwidth measurements, in some example embodiments, based on both conditions being satisfied, such as for example, the indicator bit representing that the wideband measurement should be performed and the "allowedMeasBandwidth" parameter being greater than or equal to a threshold value, such as 10 MHz and the like. When this is the case, the user equipment may adjust the measurement bandwidth for purposes of, for example, received signal, strength indicator (RSSI), reference signal, received power (RSRP), reference signal, received quality (RSRQ), and/or any other measurements. For example, the RSRQ may be adjusted from a minimum bandwidth measurement, such as over six physical resource blocks, to a wider bandwidth measurement over a bandwidth wider than the six physical resource blocks and potentially up to the allowed measurement bandwidth corresponding to the "allowedMeasBandwidth" parameter.

As noted above, the "allowedMeasBandwidth" parameter may be compared against a threshold, such as 10 MHz. This threshold may be determined in various ways. For example, the threshold for the "allowedMeasBandwidth" parameter may be defined in a specification. The threshold may be signaled by the network to the user equipment, and this signaling may be special purpose signaling for communicating the decision threshold. Moreover, the threshold may comprise a plurality of thresholds to enable a wider variability in the measurement bandwidths used at the user equipment.

Before providing additional examples, the following provides additional description with respect to the example system framework 100 depicted at FIG. 1.

System 100 may include one or more user equipment, such as for example user equipment 114A-B, and one or more access points, such as for example base stations 110A-C. In some example embodiments, base station 110A may serve a cell, such as for example macrocell 112A, wireless access point/base station 110B may serve a small cell 112B, such as for example a picocell, a femtocell, a home base station, wireless access point and the like or another macro cell, and base station 110C may serve cell 112C, although base stations 110A-C may serve other types of cells as well. Moreover, the base stations 110A-C may have wired and/or wireless backhaul links to other network nodes, such as for example a mobility management entity, other base stations, a radio network controller, a core network, a serving gateway, and/or the like.

In some example embodiments, user equipment 114A-C may be implemented as a mobile device and/or a stationary device. The user equipment can be referred to as, for example, mobile stations, mobile units, subscriber stations, wireless terminals, tablets, smart phones, a wireless handheld device, a wireless plug-in accessory, or the like. In some example embodiments, the user equipment may be implemented as multi-mode user devices configured to operate using a plurality of radio access technologies, although a single-mode device may be used as well. For example, user equipment may be configured to operate using a plurality of radio access technologies including one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio access technologies. Moreover, the user equipment 114 may be configured to have established connections to access points using a plurality of the radio access technologies.

The base stations 110A-C may, in some example embodiments, be implemented as an evolved Node B (eNB) type base station, although other types of radio, access points may be implemented as well, such as Universal Terrestrial Radio Access (UTRA) and GSM compatible base stations. When the evolved Node B (eNB) type base station is used, the one or more of the base stations may be configured in accordance with standards, including the Long Term Evolution (LTE) standards, such as for example 3GPP TS 36.201, Evolved Universal Terrestrial Radio Access (E-UTRA), Long Term Evolution (LTE) physical layer, General description, 3GPP TS 36.211, Evolved Universal Terrestrial Radio Access (E-UTRA), Physical channels and modulation, 3GPP TS 36.212, Evolved Universal Terrestrial Radio Access (E-UTRA), Multiplexing and channel coding, 3GPP TS 36.213, Evolved Universal Terrestrial Radio Access (E-UTRA), Physical layer procedures, 3GPP TS 36.214, Evolved Universal Terrestrial Radio Access (E-UTRA), Physical layer—Measurements Protocol specification, 3GPP TS 36.331, Technical Specification Group Radio Access Network, Evolved Universal Terrestrial Radio Access (E-UTRA), Radio Resource Control (RRC), and any subsequent additions or revisions to these and other 3GPP series of standards (collectively referred to as LTE standards). The base stations may also be configured to serve cells using a WLAN technology, such as for example WiFi (for example, the IEEE 802.11 series of standards), as well as any other radio access technology capable of serving a cell.

In some example embodiments, system 100 may include access links 122A-B. The access links may include downlinks 116A-B for transmitting to the user equipment and uplinks 126A-B for transmitting from user equipment to a base station. The downlink may comprise a modulated radio frequency carrying information, such as for example user data, radio resource control (RRC) messages, information configuring a user equipment, handover commands, and/or the like, to user equipment, and the uplink may comprise a modulated radio frequency carrying information, such as for example user data, RRC messages, user equipment capabilities reporting, measurement reports, and/or the like, from the user equipment to a base station. The downlinks and uplinks may, in some example embodiments, each represent a radio frequency (RF) signal. The RF signal may, as noted above, carry data, such as for example voice, video, images, Internet Protocol (IP) packets, control information, and any other type of information and/or messages. For example, when LTE is used, the RF signal may use OFDMA. OFDMA is a multi-user version of orthogonal frequency division multiplexing (OFDM). In OFDMA, multiple access is achieved by assigning, to individual users, groups of subcarriers (also referred to as subchannels or tones). The subcarriers are modulated using BPSK (binary phase shift keying), QPSK (quadrature phase shift keying), or QAM (quadrature amplitude modulation), and carry symbols (also referred to as OFDMA symbols) including data coded using a forward error-correction code. The subject matter described herein is not limited to application to OFDMA systems, LTE, LTE-Advanced, or to the noted standards, specifications, and/or technologies.

Although FIG. 1 depicts a specific quantity and configuration of base stations, cells, and user equipment, other quantities and configurations may be implemented as well.

Figure 2A:
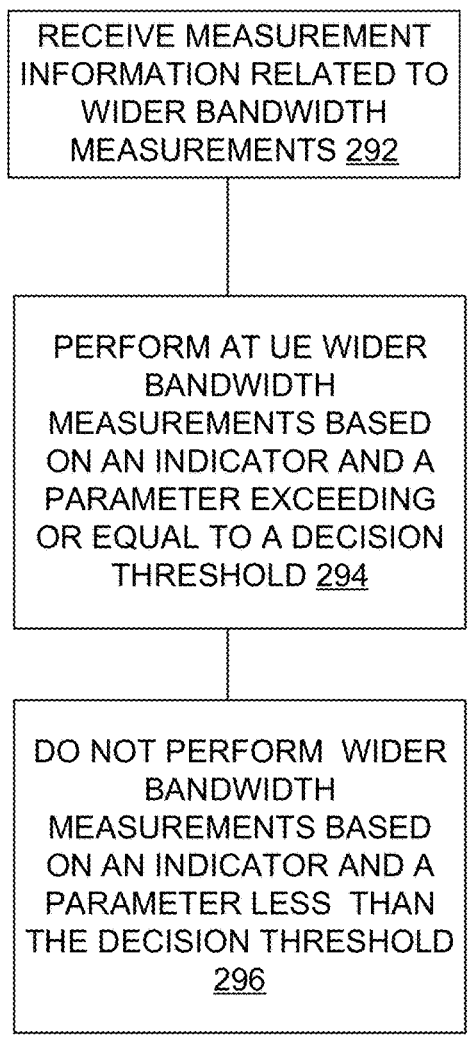
FIGS. 2A-2B depict examples of processes for indicating to the user equipment whether a wider bandwidth measurement should be performed, in accordance with some example embodiments.

FIG. 2A depicts a process 290 for configuring a user equipment to perform wider bandwidth measurements based on two conditions, in accordance with some example embodiments. The description of FIG. 2A also refers to FIG. 1.

At 292, the user equipment 114A may receive measurement information. For example, user equipment 114A may receive from the network, including base station 110A and the like, a measurement bandwidth parameter, such as the "allowedMeasBandwidth" parameter. The user equipment 114A may also receive the indication bit representative of whether the wideband measurement should be performed. In some example embodiments, the "allowedMeasBandwidth" parameters is sent to the user equipment based on signaling described in 3GPP TS 36.331, although other formats may be used as well.

At 294, if the "allowedMeasBandwidth" parameter is equal to or exceeds a threshold and the indication bit represents that a wider measurement should be performed, the user equipment 114A performs wider measurement bandwidth for the mobility measurement, such as for example, receive signal received quality (RSRQ), receive signal receive power, and other measurements as well. For example, if the "allowedMeasBandwidth" parameter is equal to or exceeds a threshold of 10 MHz and the indication bit corresponds to "1" or True (which in this example represents that a wider bandwidth measurement is required at the user equipment), the user equipment 114A performs wider measurement bandwidth, such as a measurement bandwidth greater than six physical resource blocks (6 PRBs), although the upper limit may be limited to not exceed the allowed measurement bandwidth. For example, the RSRQ may be adjusted from a minimum bandwidth measurement over six physical resource blocks to a wider bandwidth measurement over a bandwidth wider than the six physical resource blocks and up to but potentially less than the allowed measurement bandwidth corresponding to the bandwidth of the "allowedMeasBandwidth" parameter. As noted above, the threshold used in the comparison with the "allowedMeasBandwidth" may be signaled by the network or may be fixed in a specification. The mobility measurements made under the wide bandwidth conditions may be reported by the user equipment to the network.

At 296, if the "allowedMeasBandwidth" parameter is less than the threshold and/or the indication bit represents that a wider measurement should not be performed, the user equipment 114A is not mandated to use a wider measurement bandwidth for the mobility measurement, such as RSRQ and the like. For example, the user equipment 114A may perform the RSRQ measurement over 6PRBs, and then report mobility measurement to the network. Although process 290 shows user equipment 114A either performing 294 or not performing the wider bandwidth measurement at 296, user equipment 114A may as a default need not perform the wider bandwidth measurements. When this default is the case, user equipment 114A may not, in some example embodiments, need to perform the wider bandwidth measurements based on an indicator and/or a parameter being less than the decision threshold as noted at 296.

Figure 2B:
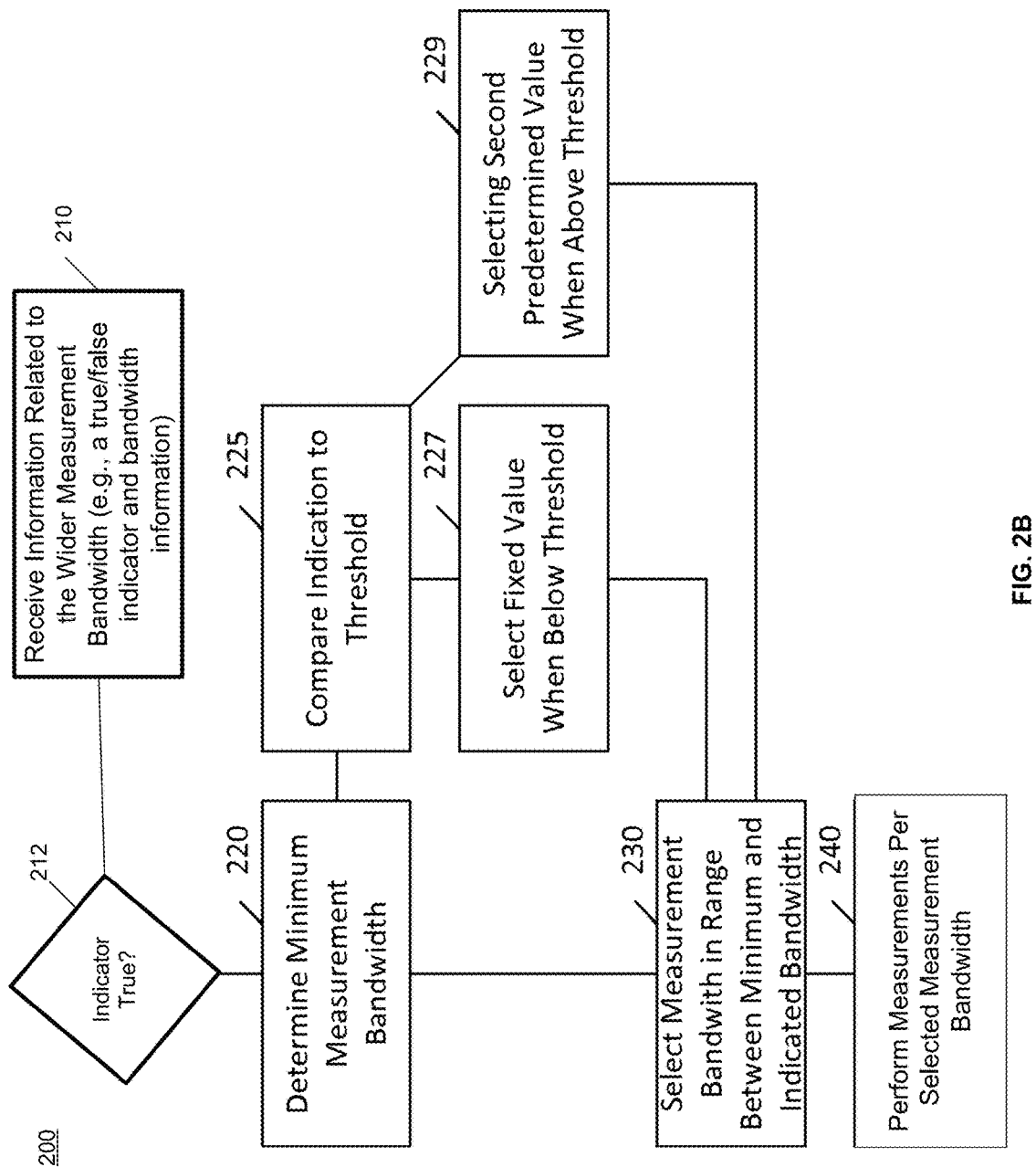

FIG. 2B illustrates a process 200 according to some example embodiments. The description of process 200 also refers to FIG. 1.

In some example embodiments, the user equipment 114A may receive, at 210, from the network, including base station 110A, measurement information including the indication bit representative of whether the user equipment should perform a wider bandwidth measurement and bandwidth information, such as at least one of the "allowedMeasBandwidth" parameter, a serving cell bandwidth, and the like.

In some example embodiments, if the indication bit represents that the wideband measurement should be performed (for example, the indication bit represents True), process 200 may, at 212, proceed to 220; otherwise, the process 200 may wait for additional information at 210 indicating that the wider bandwidth measurements should be performed (for example, until the indication bit represents True).

At 220, the process may further include determining a minimum measurement bandwidth based on the received bandwidth parameter, such as the "allowedMeasBandwidth" parameter received at 210. The process may also include, at 225, a comparison of the received bandwidth parameter (for example, "allowedMeasBandwidth," bandwidth) to a decision threshold, which can be a configured as a predetermined value, such as 10 MHz and the like. This predetermined value may be received over an air interface or predefined in a specification.

The determining at 220 may further include, at 227, selecting, as the determined minimum measurement bandwidth, a certain fixed bandwidth value, when the received bandwidth is below the predetermined value, such as 10 MHz. The determining at 220 may further include, at 229, selecting, as the determined minimum measurement bandwidth, another fixed bandwidth value, when the received bandwidth parameter is equal to or above the predetermined value. At 230, a measurement bandwidth may be selected and thus implemented in the range between the minimum measurement bandwidth determined at 220-229 and the received bandwidth, such as the allowed measurement bandwidth and the like received by the user equipment at 210. The process 200 can further include, at 240, performing measurements in accordance with the selected measurement bandwidth. The measurements may include RSRQ, RSSI, RSRP, and/or any other measurement that may be used in a mobility determination, such as a handover decision, offloading decision, and the like.

Figure 3:
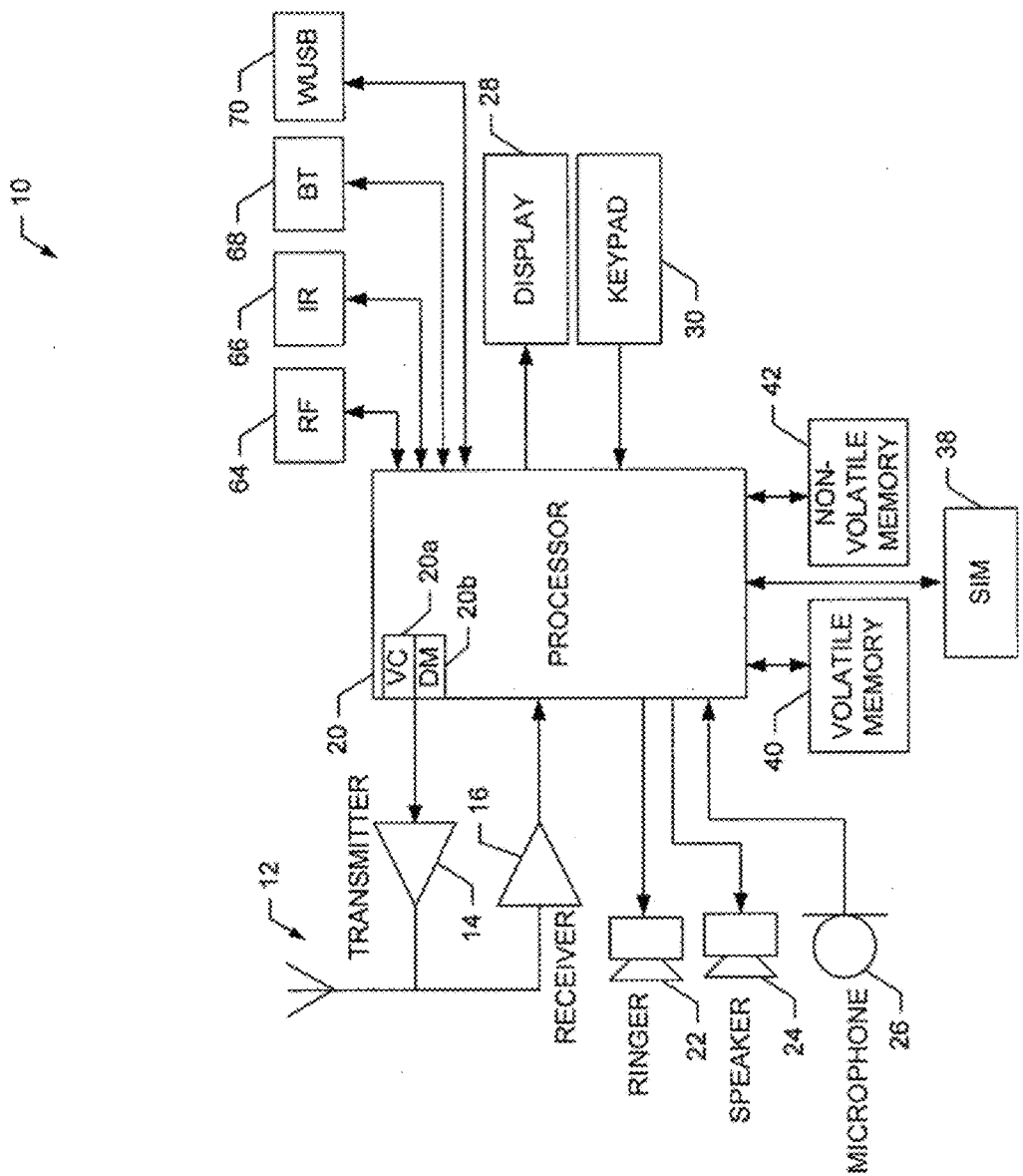
FIG. 3 depicts an example of an apparatus, in accordance with some example embodiments.

FIG. 3 illustrates a block diagram of an apparatus 10 such as, for example, a user equipment, in accordance with some example embodiments. While several features of the apparatus are illustrated and will be hereinafter described for purposes of example, other types of electronic devices, such as for example mobile telephones, mobile computers, portable digital assistants (PDAs), pagers, laptop computers, desktop computers, gaming devices, televisions, routers, home gateways, and other types of electronic systems, may employ one or more of the embodiments disclosed herein.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. More particularly, the apparatus 10 may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like). For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the apparatus 10 may be capable of operating in accordance with 2.5G wireless communication protocols General Packet Radio Service. (GPRS), Enhanced Data GSM Environment (EDGE), and/or the like. Further, for example, the apparatus 10 may be capable of operating in accordance with 3G wireless communication protocols, such as for example Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example LTE Advanced and/or the like as well as similar wireless communication protocols that may be subsequently developed.

Some Narrow-band Advanced Mobile Phone System (NAMPS) and Total Access Communication System (TACS) mobile terminal apparatuses may also benefit from one or more embodiments disclosed herein as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example a web browser. The connectivity program may allow the apparatus 10 to transmit and receive web content, such as for example location-based content, according to a protocol, such as for example wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may include user interface circuitry configured to control at least some functions of one or more elements of the user interface, such as for example, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example a keypad 30, a touch display, a joystick, and/or at least one other input device. In some embodiments including a keypad, the keypad may include numeric 0-9 and related keys, and/or other keys for operating the apparatus 10.

As shown in FIG. 3, apparatus 10 may also include one or more mechanisms for sharing and/or obtaining data. For example, the apparatus 10 may include a short-range radio frequency (RF), transceiver, and/or interrogator 64, so data may be shared with and/or obtained from electronic devices in accordance with RF techniques. The apparatus 10 may include other short-range transceivers, such as for example, for example, an infrared (IR), transceiver 66, a Bluetooth (BT), transceiver 68 operating using Bluetooth wireless technology, a wireless universal serial bus (USB) transceiver 70 and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example within 10 meters, for example. The apparatus 10 may also be capable of transmitting and/or receiving data from electronic devices according to various wireless networking techniques, including 6LoWpan, Wi-Fi, Wi-Fi low power, WLAN techniques such as for example IEEE 802.11 techniques, IEEE 802.15 techniques, IEEE 802.16 techniques, and/or the like.

The apparatus 10 may comprise memory, such as for example a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as for example an international mobile equipment identification (IMEI) code, capable of uniquely identifying apparatus 10. The functions may include one or more of the operations disclosed herein with respect to the user equipment, such as for example, the functions disclosed at process 200 (for example, implementing a wider measurement bandwidth based on an indication bit and an allowed measurement bandwidth parameter). The memories may comprise an identifier, such as for example an international mobile equipment identification (IMEI) code, capable of uniquely identifying apparatus 10.

FIG. 4 depicts an example implementation of a network node, such as one of the base stations 110A-C. The base station may include one or more antennas 420 configured to transmit via a downlink and configured to receive uplinks via the antenna(s) 420. The base station may further include a plurality of radio interfaces 440 coupled to the antenna 420. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio access technologies. The radio interface 440 may further include other components, such as filters, converters (for example, digital-to-analog converters and the like), mappers, a Fast Fourier Transform (FFT) module, and the like, to generate symbols for a transmission via one or more downlinks and to receive symbols (for example, via an uplink). The base station may further include one or more processors, such as processor 430, for controlling the access point 400 and for accessing and executing program code stored in memory 435. In some example embodiments, the memory 435 includes code, which when executed by at least one processor causes one or more of the operations described herein with respect to a base station. For example, the base station may provide to the user equipment measurement information, as described above with respect to 292, to configure the user equipment to perform the wider bandwidth measurements, and may provide, to the user equipment, the "allowedMeasBandwidth" parameter. Moreover, the base station may configure the "allowedMeasBandwidth" parameter to a value of about 10 MHz (which represents a threshold at which the user equipment performs the wider bandwidth RSRQ measurements), and/or provide any other operations associated with the network or base station disclosed herein.

Without in any way limiting the scope, interpretation, or application of the claims appearing below, a technical effect of one or more of the example embodiments disclosed herein is making wider bandwidth measurements, when needed by the user equipment. Without in any way limiting the scope, interpretation, or application of the claims appearing below, a technical effect of one or more of the example embodiments disclosed herein may include providing the network a way to control whether the wider measurement bandwidth is applied, while also reducing the power consumption impact to the user equipment/terminal by performing wider bandwidth measurements (which consume more power) only on occasions when seen necessary by the network.

Some of the embodiments disclosed herein may be implemented in software, hardware, application logic, or a combination of software, hardware, and application logic. The software, application logic, and/or hardware may reside on memory, such as memory 40, memory 435, the control apparatus 20, or electronic components, for example. In some example embodiments, the application logic, software or an instruction set is maintained on any one of various conventional computer-readable media. In the context of this document, a "computer-readable medium" may be any media that can contain, store, communicate, propagate or transport the instructions for use by or in connection with an instruction execution system, apparatus, or device, such as for example a computer (for example processor 20 and/or processor 430). A computer-readable medium may comprise a non-transitory computer-readable storage medium that may be any media that can contain or store the instructions for use by or in connection with an instruction execution system, apparatus, or device, such as for example a computer. And, some of the embodiments disclosed herein include computer programs configured to cause methods as disclosed herein (see, for example, processes 200, 290, and the like).

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

The invention claimed is:

1. A method comprising:
   receiving, at a user equipment, an indicator and a measurement bandwidth, wherein the indicator represents whether the user equipment is enabled to perform a wide bandwidth measurement, and wherein the received measurement bandwidth represents a maximum allowed measurement bandwidth; and
   performing, by the user equipment, the wide bandwidth measurement, when the received measurement bandwidth equals or exceeds a threshold and the indicator represents a request to the user equipment to perform the wide bandwidth measurement.

2. The method of claim 1, wherein the received measurement bandwidth comprises an allowed measurement bandwidth in accordance with The Third Generation Partnership Project, Technical Specification 36.331.

3. The method of claim 1, wherein the threshold comprises an allowedMeasBandwidth, wherein the allowedMeasBandwidth comprises at least one of 50 resource blocks or 10 Megahertz.

4. The method of claim 1, wherein the indication and the measurement bandwidth are received in a measurement configuration signaled by the network when in a connected mode, or received in at least one system information block broadcast by the network when in an idle mode.

5. The method of claim 1, wherein the performing further comprises:
   performing, by the user equipment, a minimum bandwidth measurement comprising six physical resource blocks, when at least one of the indicator represents that the user equipment is not enabled by the network to perform the wide bandwidth measurement or the received measurement bandwidth is less than the threshold.

6. The method of claim 1, wherein the wide bandwidth measurement comprises at least one of a received signal, strength indicator measurement, a reference signal, received power measurement, a reference signal, received quality measurement, and wherein the wide bandwidth measurement exceeds six physical resource blocks but does not exceed the maximum allowed measurement bandwidth.

7. The method of claim 1, further comprising:
   sending, by the user equipment, a measurement report including information representative of whether wide bandwidth measurement was performed by the user equipment.

8. An apparatus, comprising:
   at least one processor; and
   at least one memory including computer program code, the at least one memory and the computer program code configured to, with the at least one processor, cause the apparatus to perform at least the following:
   receive an indicator and a measurement bandwidth, wherein the indicator represents whether the apparatus is enabled to perform a wide bandwidth measurement, and wherein the received measurement bandwidth represents a maximum allowed measurement bandwidth; and
   performing the wide bandwidth measurement, when the received measurement bandwidth equals or exceeds a threshold and the indicator represents a request to the apparatus to perform the wide bandwidth measurement.

9. The apparatus of claim 8, wherein the received measurement bandwidth comprises an allowed measurement bandwidth in accordance with The Third Generation Partnership Project, Technical Specification 36.331.

10. The apparatus of claim 8, wherein the threshold comprises an allowedMeasBandwidth, wherein the allowedMeasBandwidth comprises at least one of 50 resource blocks or 10 Megahertz.

11. The apparatus of claim 8, wherein the indication and the measurement bandwidth are received in a measurement configuration signaled by the network when in a connected mode, or received in at least one system information block broadcast by the network when in an idle mode.

12. The apparatus of claim 8, wherein the apparatus is further configured to perform a minimum bandwidth measurement comprising six physical resource blocks, when at least one of the indicator represents that the apparatus is not enabled by the network to perform the wide bandwidth measurement or the received measurement bandwidth is less than the threshold.

13. The apparatus of claim 8, wherein the wide bandwidth measurement comprises at least one of a received signal, strength indicator measurement, a reference signal, received power measurement, a reference signal, received quality measurement, and wherein the wide bandwidth measurement exceeds six physical resource blocks but does not exceed the maximum allowed measurement bandwidth.

14. The apparatus of claim 8, wherein the apparatus is further configured to send a measurement report including information representative of whether wide bandwidth measurement was performed by the apparatus.

15. A non-transitory machine-readable medium encoded with instructions that, when executed by at least one processor, perform at least:

receiving, at a user equipment, an indicator and a measurement bandwidth, wherein the indicator represents whether the user equipment is enabled to perform a wide bandwidth measurement, and wherein the received measurement bandwidth represents a maximum allowed measurement bandwidth; and performing, by the user equipment, the wide bandwidth measurement, when the received measurement bandwidth equals or exceeds a threshold and the indicator represents a request to the user equipment to perform the wide bandwidth measurement.

16. A method comprising:

sending, to a user equipment, an indicator and a measurement bandwidth, wherein the indicator represents whether the user equipment is enabled to perform a wide bandwidth measurement, and wherein the received measurement bandwidth represents a maximum allowed measurement bandwidth; and receiving, from the user equipment, a wide bandwidth measurement, when the received measurement bandwidth equals or exceeds a threshold and the indicator represents a request to the user equipment to perform the wide bandwidth measurement.

17. The method of claim 16, wherein the threshold comprises 10 Megahertz.

* * * * *